United States Patent
Shin et al.

(10) Patent No.: US 10,404,930 B2
(45) Date of Patent: Sep. 3, 2019

(54) PIXEL PROCESSING APPARATUS OF PROCESSING BAD PIXEL AND REMOVING NOISE, AND IMAGE SIGNAL PROCESSING APPARATUS AND IMAGE PROCESSING SYSTEM EACH INCLUDING THE SAME

(71) Applicant: Samsung Electronics Co., Ltd., Suwon-si, Gyeonggi-do (KR)

(72) Inventors: Deok Ha Shin, Seoul (KR); Kyeong Jong Lim, Seoul (KR); Jung Hoon Jung, Hwaseong-si (KR); Young Sung Cho, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 325 days.

(21) Appl. No.: 14/939,315

(22) Filed: Nov. 12, 2015

(65) Prior Publication Data
US 2016/0142659 A1 May 19, 2016

(30) Foreign Application Priority Data
Nov. 13, 2014 (KR) .......................... 10-2014-0158345

(51) Int. Cl.
*H04N 5/367* (2011.01)
*H04N 5/361* (2011.01)

(52) U.S. Cl.
CPC .............. *H04N 5/367* (2013.01); *H04N 5/361* (2013.01)

(58) Field of Classification Search
CPC .... H04N 5/217; H04N 5/3675; H04N 5/2176; H04N 5/378; H04N 5/361
USPC .................................................. 348/241, 246
See application file for complete search history.

(56) References Cited

U.S. PATENT DOCUMENTS

| | | | |
|---|---|---|---|
| 5,579,049 A * | 11/1996 | Shimaya | H04N 5/2352 348/229.1 |
| 6,741,753 B1 * | 5/2004 | Moroney | H04N 1/6086 382/167 |
| 8,000,523 B2 | 8/2011 | Kang | |
| 8,063,957 B2 | 11/2011 | Goma et al. | |
| 8,164,661 B2 | 4/2012 | Park et al. | |
| 8,259,198 B2 | 9/2012 | Cote et al. | |
| 8,754,964 B2 | 6/2014 | Yamaguchi | |

(Continued)

FOREIGN PATENT DOCUMENTS

| | | |
|---|---|---|
| JP | 2003069901 A | 3/2003 |
| JP | 2008028475 A | 2/2008 |

(Continued)

*Primary Examiner* — Antoinette T Spinks
(74) *Attorney, Agent, or Firm* — Harness, Dickey & Pierce, P.L.C.

(57) ABSTRACT

Provided are a pixel processing apparatus, and an image signal processing apparatus and an image processing system each including the same. The pixel processing apparatus includes a bad pixel processing unit configured to determine whether a target pixel is a bad pixel based on pixel data of an image sensor, output a bad pixel detection signal according to a result of determining whether the target pixel is a bad pixel, compensate for a pixel value of the target pixel based on the pixel data, and output the compensated pixel value; and a noise removal unit configured to remove noise from the pixel value of the target pixel, based on the bad pixel detection signal, the pixel value, the compensated pixel value, and weight information.

10 Claims, 9 Drawing Sheets

(56) References Cited

U.S. PATENT DOCUMENTS

| | | | | |
|---|---|---|---|---|
| 2007/0195178 A1* | 8/2007 | Ooishi | ........... | H04N 5/357 |
| | | | | 348/241 |
| 2009/0040343 A1* | 2/2009 | Kao | ........... | H04N 5/3675 |
| | | | | 348/246 |
| 2011/0090372 A1* | 4/2011 | Doida | ........... | G06T 5/008 |
| | | | | 348/239 |
| 2011/0102648 A1* | 5/2011 | Nomoto | ........... | H04N 5/3675 |
| | | | | 348/246 |
| 2011/0141325 A1* | 6/2011 | Nakajima | ........... | H04N 5/367 |
| | | | | 348/246 |
| 2011/0228295 A1* | 9/2011 | Doida | ........... | G06T 5/50 |
| | | | | 358/1.9 |
| 2011/0242379 A1* | 10/2011 | Kato | ........... | H01L 27/14609 |
| | | | | 348/300 |
| 2012/0257825 A1* | 10/2012 | Yoo | ........... | G06T 5/005 |
| | | | | 382/167 |
| 2013/0010153 A1* | 1/2013 | Kasai | ........... | H04N 5/347 |
| | | | | 348/222.1 |
| 2014/0152694 A1* | 6/2014 | Narasimha | ........... | G09G 5/377 |
| | | | | 345/629 |
| 2015/0244953 A1* | 8/2015 | Furuya | ........... | H04N 5/3675 |
| | | | | 348/246 |

FOREIGN PATENT DOCUMENTS

| | | |
|---|---|---|
| JP | 2009105582 A | 5/2009 |
| JP | 2009130553 A | 6/2009 |
| JP | 2012070319 A | 4/2012 |
| KR | 20050102729 A | 10/2005 |
| KR | 20070000685 A | 1/2007 |
| KR | 20110079317 A | 7/2011 |

\* cited by examiner

PIXEL PROCESSING APPARATUS OF PROCESSING BAD PIXEL AND REMOVING NOISE, AND IMAGE SIGNAL PROCESSING APPARATUS AND IMAGE PROCESSING SYSTEM EACH INCLUDING THE SAME

CROSS-REFERENCE TO RELATED APPLICATION

This application claims the benefit of Korean Patent Application No. 10-2014-0158345, filed on Nov. 13, 2014, in the Korean Intellectual Property Office, the disclosure of which is incorporated herein in its entirety by reference.

BACKGROUND

1. Field

One or more embodiments of the inventive concepts relate to a pixel processing apparatus, and an image signal processing apparatus and an image processing system each including the same, and more particularly, to a pixel processing apparatus capable of removing noise from a target pixel based on information generated during detection of bad pixels, thereby reducing the area thereof and power consumption therein, and an image signal processing apparatus and an image processing system each including the same.

2. Related Art

An image sensor is a device that converts an image spread out in one's view into an electric signal using a photoelectric device, converts the electric signal into a digital signal, and transmits the digital signal to a display device.

An image sensor may include bad pixels due to various causes during a manufacturing process thereof. The quality of an image is degraded by the bad pixels. Thus, a pixel processing apparatus capable of detecting bad pixels and removing noise is needed.

SUMMARY

According to at least one example embodiment, a pixel processing apparatus includes a bad pixel processing unit configured to determine whether a target pixel is a bad pixel based on pixel data of an image sensor, output a bad pixel detection signal according to a result of determining whether the target pixel is a bad pixel, generate a compensated pixel value by compensating a first pixel value of the target pixel based on the pixel data, and output the compensated pixel value; and a noise removal unit configured to generate a second pixel value by removing noise from the first pixel value, based on the first pixel value, the bad pixel detection signal, the compensated pixel value, and weight information.

The bad pixel processing unit may be configured to determine whether a target pixel is a bad pixel based on pixel data having a reference size among pixel data of an image sensor, and generate a compensated pixel value by compensating a first pixel value of the target pixel based on the pixel data having the reference size.

The bad pixel processing unit may include a bad pixel detection unit configured to output the bad pixel detection signal; a pixel compensation unit configured to output the compensated pixel value; and a weight information generation unit configured to generate the weight information by using the pixel data of the image sensor.

The bad pixel detection unit may apply an M×N kernel to the pixel data having the reference size, and determines whether the target pixel is a bad pixel, based on a central pixel and neighboring pixels that are present within the kernel, wherein M and N are integers each equal to or greater than '1'.

The weight information generation unit may apply an M×N kernel to the pixel data having the reference size, and generate the weight information based on a central pixel and neighboring pixels that are present within the kernel, wherein M and N are integers each equal to or greater than '1'.

The noise removal unit may be configured to output the compensated pixel value when the target pixel is a bad pixel, and output the second pixel value when the target pixel is not a bad pixel, based on the bad pixel detection signal.

The second pixel value may be a weighted average between the first pixel value and the compensated pixel value.

The bad pixel processing unit may include a bad pixel detection unit configured to output the bad pixel detection signal; a pixel compensation unit configured to output the compensated pixel value; and a weight information generation unit configured to generate the weight information based on at least one of an analog gain or an exposure time.

The bad pixel processing unit may include a bad pixel detection unit configured to output the bad pixel detection signal; a pixel compensation unit configured to output the compensated pixel value; and a weight information generation unit configured to generate the weight information based on an analog gain, an exposure time, and the pixel data of the image sensor.

The pixel data of the image sensor may be image data in an RGB format.

The bad pixel processing unit may include a bad pixel detection unit configured to output the bad pixel detection signal; a pixel compensation unit configured to output the compensated pixel value; and a weight information generation unit configured to generate the weight information based on at least one of the pixel data of the image sensor, an analog gain, or an exposure time.

The bad pixel detection unit may be configured to apply an M×N kernel to the pixel data, and determine whether the target pixel is a bad pixel, based on a central pixel and neighboring pixels present in the kernel, and the weight information generation unit may be configured to apply an M×N kernel to the pixel data, and generate the weight information based on a central pixel and neighboring pixels present in the kernel, wherein M and N are integers each equal to or greater than '1'.

The noise removal unit may output the compensated pixel value when the target pixel is a bad pixel and outputs the second pixel value when the target pixel is not a bad pixel, based on the bad pixel detection signal.

The second pixel value may be a weighted average between the first pixel value and the compensated pixel value.

The bad pixel processing unit may include a bad pixel detection unit configured to output the bad pixel detection signal; a pixel compensation unit configured to output the compensated pixel value; and a weight information generation unit configured to generate the weight information based on at least one of an analog gain or an exposure time.

The bad pixel processing unit may be configured to store, in a line memory pixel, data having a reference size among the pixel data, compensate for the pixel value based on the stored pixel data, and determine whether the target pixel is a bad pixel, and the noise removal unit may be configured such that the noise removal unit, does not use the pixel data stored in the line memory, and does not include an additional memory for storing the pixel data.

According to at least one example embodiment of the inventive concepts, an image signal processing system includes an image sensor configured to generate pixel data in an RGB format; and an application processor configured to process the pixel data, wherein the application processor includes, a bad pixel processing unit configured to determine whether a target pixel is a bad pixel based on the pixel data, output a bad pixel detection signal according to a result of determining whether the target pixel is a bad pixel, generate a compensated pixel value by compensating a first pixel value of the target pixel based on the pixel data, and output the compensated pixel value; and a noise removal unit configured to generate a second pixel value by removing noise from the first pixel value, based on the bad pixel detection signal, the first pixel value, the compensated pixel value, and weight information.

The noise removal unit may be configured to output the compensated pixel value when the target pixel is a bad pixel, and output the second pixel value when the target pixel is not a bad pixel, based on the bad pixel detection signal.

The bad pixel processing unit may include a bad pixel detection unit configured to output the bad pixel detection signal; a pixel compensation unit configured to output the compensated pixel value; and a weight information generation unit configured to generate the weight information based on at least one of an analog gain or an exposure time.

The bad pixel processing unit may include a bad pixel detection unit configured to output the bad pixel detection signal; a pixel compensation unit configured to output the compensated pixel value; and a weight information generation unit configured to generate the weight information based on an analog gain, an exposure time, and the pixel data of the image sensor.

According to at least one example embodiment of the inventive concepts, an image signal processing system includes an image sensor configured to generate first pixel data; a line memory configured to store the first pixel data as stored pixel data; a bad pixel processing unit configured to, determine whether a target pixel is a bad pixel based on the stored pixel data, output a bad pixel detection signal according to a result of determining whether the target pixel is a bad pixel, generate a compensated pixel value by compensating a first pixel value, the first pixel value being a value from among values of the stored pixel data that corresponds to the target pixel, and output the compensated pixel data; and a noise removal unit configured to, receive the generated first pixel data, and generate a second pixel value by removing noise from the generated first pixel data, based on the bad pixel detection signal, the generated first pixel data the compensated pixel value, and weight information.

The noise removal unit may be configured to generate the second pixel value without using the stored pixel value.

The noise removal unit may be configured to generate the second pixel value without storing the generated first pixel data in a memory.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION OF THE EMBODIMENTS

Figure 1:
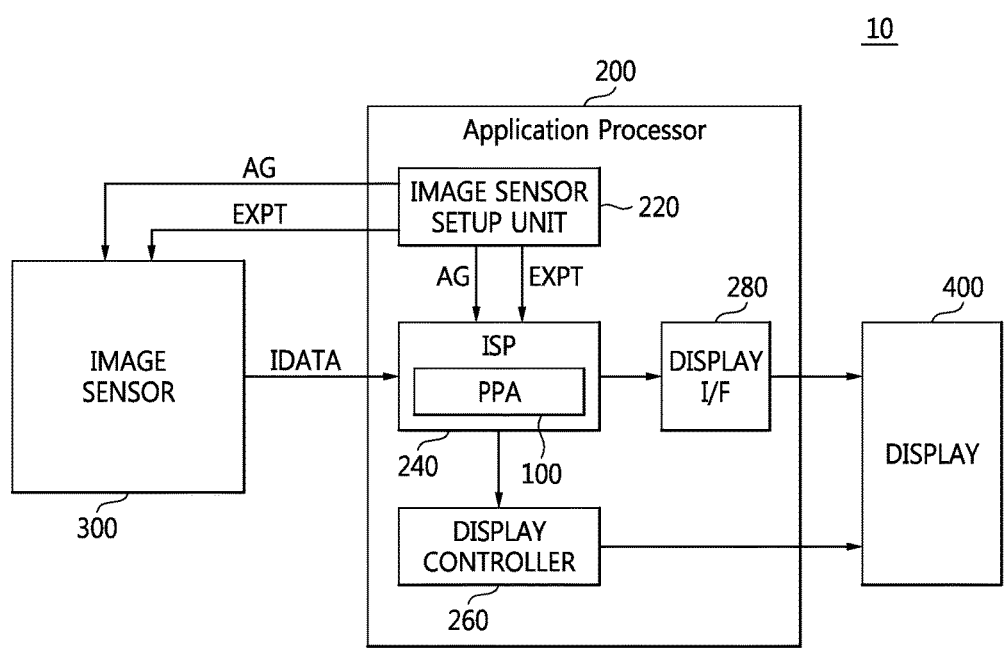
FIG. 1 is a schematic block diagram of an image processing system according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a schematic block diagram of an image processing system 10 according to at least one example embodiment of the inventive concepts.

Referring to FIG. 1, the image processing system 10 according to at least one example embodiment of the inventive concepts may include an application processor (AP) 200, an image sensor 300, and a display unit 400.

The term 'processor', as used herein, may refer to, for example, an element that is, or includes, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multiprocessor, an application-specific integrated circuit (ASIC), and a field programmable gate array (FPGA).

The image sensor 300 may converts the intensity of light incident when a subject is photographed into an electrical signal by using a photoelectric device, convert the electric signal into a digital signal, and output the digital signal. The digital signal may be output in the form of pixel data containing information regarding the subject, and may be a signal with a stream in which digital values corresponding to pixels are sequentially arranged. According to at least one example embodiment of the inventive concepts, the image sensor may include a pixel array including pixels arranged in rows and columns. According to at least one example embodiment of the inventive concepts, the pixel array may be an active pixel sensor (APS) array and the image sensor may be a complementary-metal-oxide-semiconductor (CMOS) image sensor.

Also, the image sensor 300 may receive an analog gain AG and exposure time information EXPT from an image sensor setup unit 220. The analog gain AG and the exposure time information EXPT will be described in detail with reference to FIG. 5 below.

The AP 200 may include the image sensor setup unit 220, an image signal processor (ISP) 240, a display interface (I/F) 280, and a display controller 260. The AP 200 is one embodiment of a processor and may be embodied as an integrated circuit, a system-on-chip (SOC), or a mobile AP. According to at least one example embodiment of the inventive concepts, one or more of the AP 200, image sensor set up unit 220, ISP 240, display interface 280 and display controller 260 may be, be included in, or be implemented as circuitry or by one or more circuits. Alternatively, according to at least one example embodiment of the inventive concepts, one or more of the image sensor set up unit 220, ISP 240, display interface 280 and display controller 260 may be implemented by a processor (e.g., the AP 200) executing code which includes instructions corresponding to the operations discussed herein as being performed by one or more of the image sensor set up unit 220, ISP 240, display interface 280 and display controller 260.

The image sensor setup unit 220 may generate the analog gain (AG) or the exposure time information EXPT under control of the ISP 240, and output the analog gain (AG) or the exposure time information EXPT to the image sensor 300 or the ISP 240.

In general, the ISP 240 may control operations of various elements of the AP 200, e.g., the image sensor setup unit 220, the display controller 260, the display interface 280, etc.

Also, the ISP 240 may image-process and handle pixel data received from the image sensor 300, and output the processed image data to the display controller 260 or the display interface 280.

The ISP 240 may further include a pixel processing apparatus (PPA) 100 according to at least one example embodiment of the inventive concepts, and may transmit the analog gain (AG) or the exposure time information EXPT received from the image sensor setup unit 220 to the pixel processing apparatus 100. The pixel processing apparatus 100 will be described in detail with reference to FIGS. 2 to 6 below.

The display controller 260 may generate various control signals for controlling the display unit 400 under control of the ISP 240.

The display interface 280 may transmit the image data processed by the ISP 240 to the display unit 400. The display interface 280 may be embodied as, but is not limited to, an interface supporting an MIPI® (mobile industry processor interface) protocol, an interface supporting an eDP (embedded DisplayPort) protocol, or an interface supporting a HDM (high-definition multimedia interface) protocol.

The display unit 400 may display the image data received from the display interface 280 according to control signals output from the display controller 260. In one embodiment, the control signals may be transmitted to the display unit 400 through the display interface 280

The display unit 400 may be a thin-film transistor-liquid crystal display (TFT-LCD), a light-emitting diode (LED) display, an organic LED (OLED) display, an active-matrix OLED (AMOLED) display, a flexible display, or a transparent display.

Figure 2:
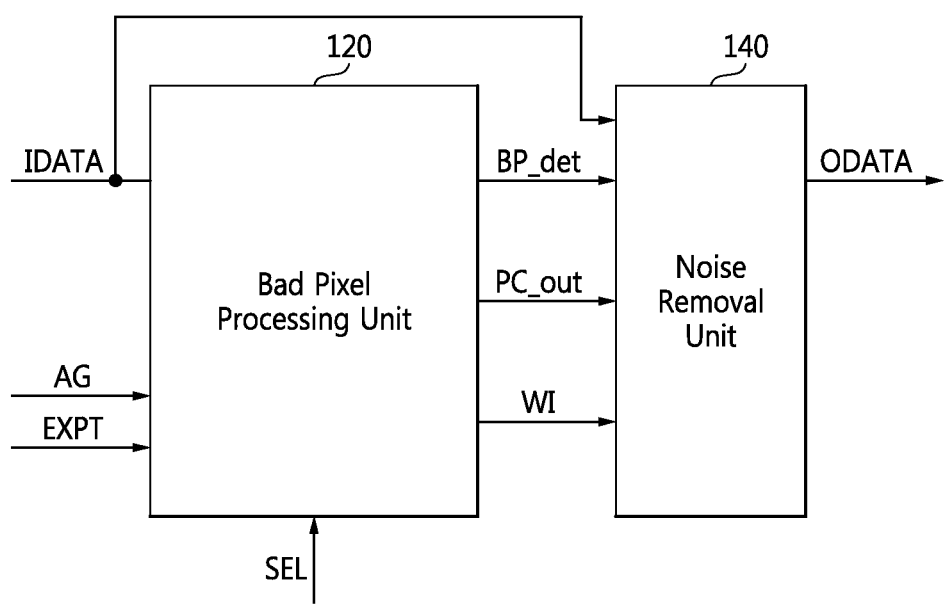
FIG. 2 is a block diagram of a pixel processing apparatus according to at least one example embodiment of the inventive concepts.

FIG. 2 is a block diagram of a pixel processing apparatus 100 according to at least one example embodiment of the inventive concepts.

For convenience of explanation, the terminology used in the present disclosure will be first described in detail.

In the present disclosure, the term "bad pixel" should be understood as a pixel caused by a physical defect or the like occurring in a complicated manufacturing process of an image sensor, the pixel having a value less than or greater than a value of a normal pixel when the pixels are exposed to the same intensity of incident light. The term "noise" should be understood as temporal noise or random noise. The temporal noise is a concept differentiated from fixed-pattern noise, and means a noise component that changes as time goes by. Examples of the temporal noise include photon shot noise, dark current noise, and read noise. The photon shot noise is generated when there is light. The dark current noise is generated when there is not light. Both the photon shot noise and the dark current noise may include noise generated when a readout operation is performed in an image sensor.

Referring to FIGS. 1 and 2, the pixel processing apparatus 100 according to at least one example embodiment of the inventive concepts receives pixel data IDATA from the image sensor 300, and determines whether a target pixel is a bad pixel or not. A compensated pixel value is output when it is determined that the target pixel is a bad pixel, and a pixel value from which noise is removed is output when it is determined that the target pixel is not a bad pixel.

In the present disclosure, it is assumed that the term "pixel data" is digital data received from the image sensor 300 and means digital data regarding a plurality of pixels. For example, pixel data received from the image sensor 300 means digital data regarding all pixels of one image, and pixel data received from a memory having a predetermined, or, alternatively, reference size means digital data regarding pixels corresponding to the predetermined, or, alternatively, reference size among pixels of one image.

In contrast, it is assumed that the term "pixel value" means digital data regarding a pixel from among all the pixels of the image.

That is, in the present disclosure, the terms "pixel data" and "pixel value" have different concepts.

Referring to FIG. 2, the pixel processing apparatus 100 according to at least one example embodiment of the inventive concepts include a bad pixel processing unit 120 and a noise removal unit 140. According to at least one example embodiment of the inventive concepts, one or more of the bad pixel processing unit 120 and the noise removal unit 140 may be, be included in, or be implemented as circuitry or by one or more circuits. Alternatively, according to at least one example embodiment of the inventive concepts, one or more of the bad pixel processing unit 120 and the noise removal unit 140 may be implemented by a processor (e.g., the AP 200) executing code which includes instructions corresponding to the operations discussed herein as being performed by one or more of the bad pixel processing unit 120 and the noise removal unit 140.

The bad pixel processing unit 120 determines whether a target pixel is a bad pixel or not, and outputs a bad pixel detection signal BP_det according to a result of determining whether the target pixel is a bad pixel. In one embodiment, the bad pixel detection signal BP_det may be set to '1' when the target pixel is a bad pixel, and set to '0' when the target pixel is not a bad pixel.

The bad pixel processing unit 120 generates a compensated pixel value PC_out by compensating for a pixel value of the target pixel, based on pixel data IDATA of the image sensor 300.

Also, the bad pixel processing unit 120 generates weight information WI, based on at least one among the pixel data IDATA, an analog gain AG, and exposure time information EXPT received from the image sensor 300.

The bad pixel processing unit 120 may generate the weight information WI by using a selection signal SEL generated by a control logic (not shown) included in the ISP 240 such that the weight information WI has different values for pixels of the image sensor 300 or has the same value for all the pixels of the image sensor 300. The bad pixel processing unit 120 will be described in detail with reference to FIGS. 3 to 5 below.

The noise removal unit 140 removes noise from a pixel value of the target pixel, based on the bad pixel detection signal BP_det, the pixel value of the target pixel, the compensated pixel value PC_out, and the weight information WI.

Based on the bad pixel detection signal BP_det, the compensated pixel value PC_out is output by the noise removal unit 140 when the target pixel is a bad pixel and the pixel value from which noise is removed is output by the noise removal unit 140 when the target pixel is not a bad pixel.

The noise removal unit 140 will be described in detail with reference to FIG. 6 below.

Figure 3:
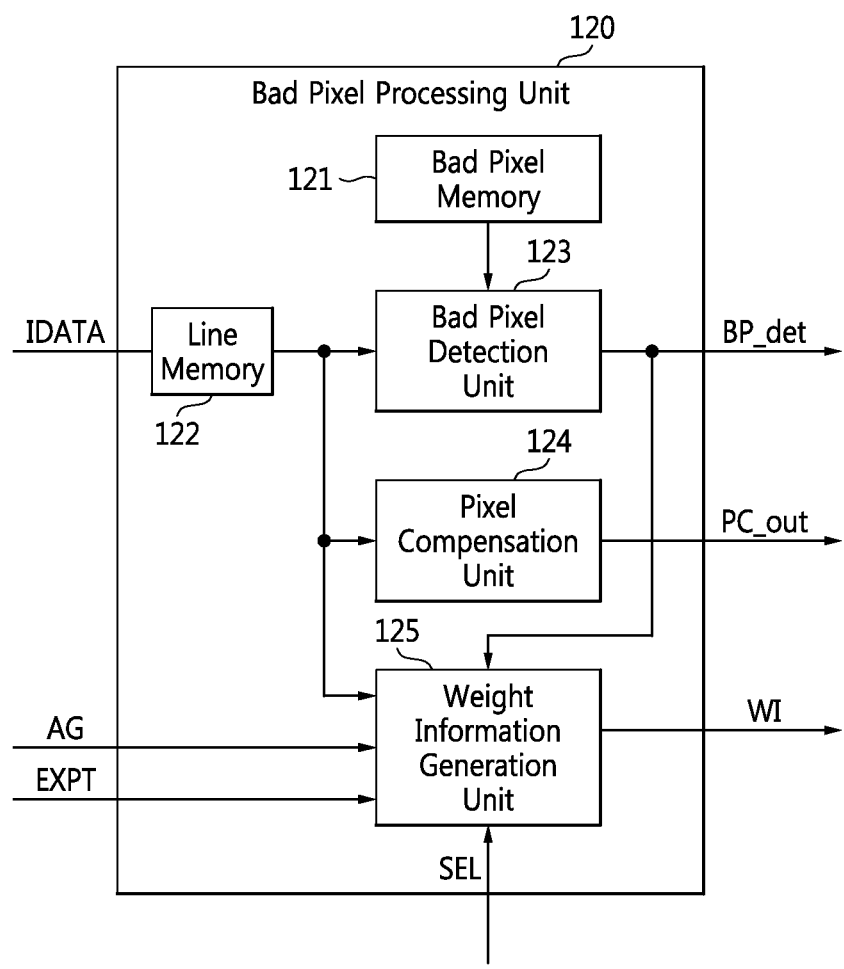
FIG. 3 is a detailed block diagram of a bad pixel processing unit of FIG. 2.
Figure 4:
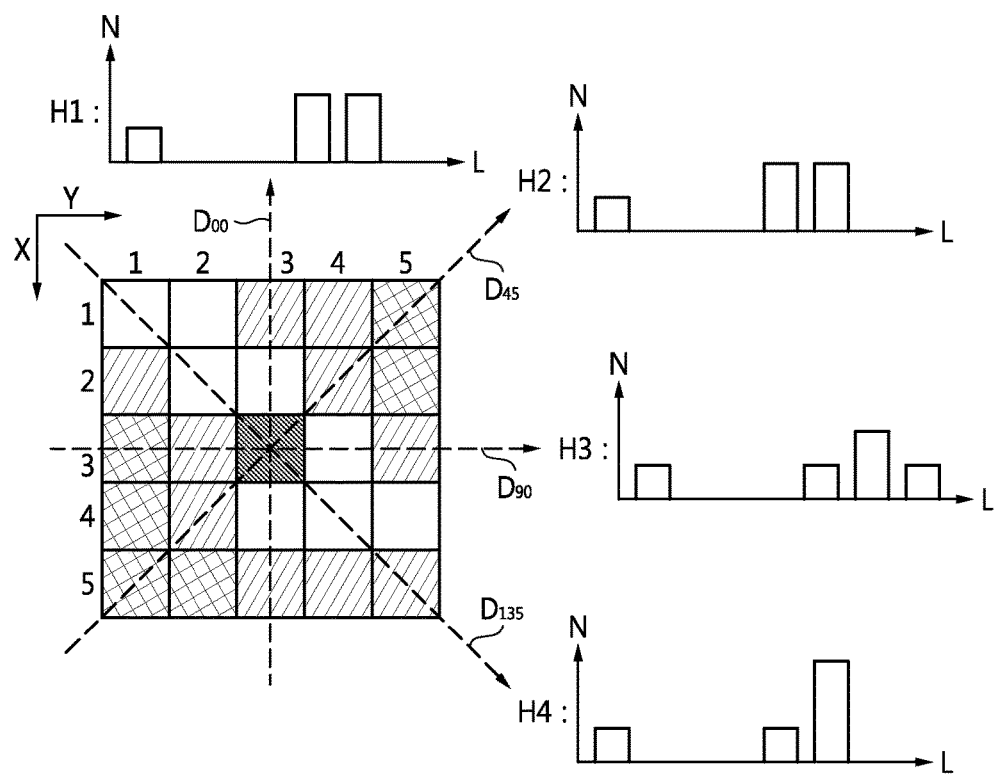
FIG. 4 is a diagram particularly illustrating operations of a bad pixel detection unit and a pixel compensation unit of FIG. 3.
Figure 5:
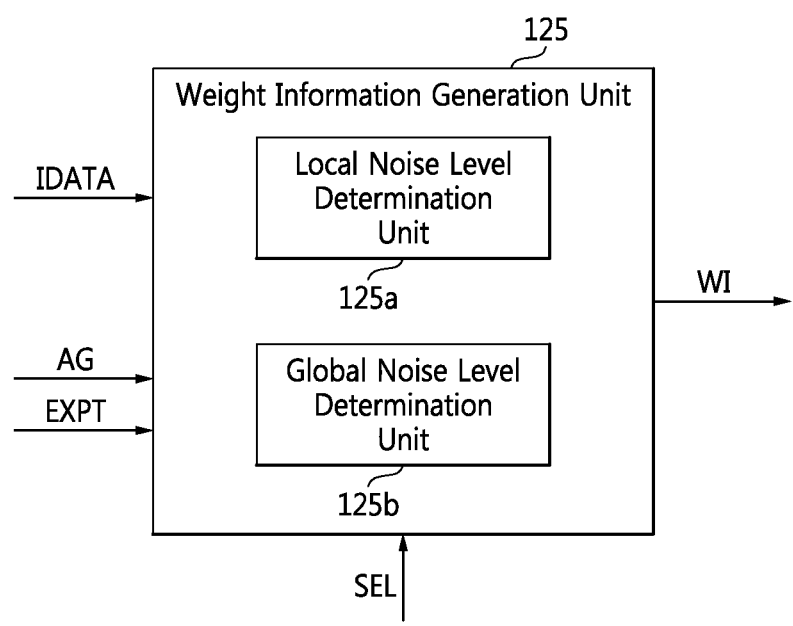
FIG. 5 is a detailed block diagram of a weight information generation unit of FIG. 3.

FIG. 3 is a detailed block diagram of the bad pixel processing unit 120 of FIG. 2. FIG. 4 is a diagram particularly illustrating operations of a bad pixel detection unit 123 and a pixel compensation unit 124 of FIG. 3. FIG. 5 is a detailed block diagram of a weight information generation unit 125 of FIG. 3.

Referring to FIG. 3, the bad pixel processing unit 120 according to at least one example embodiment of the inventive concepts includes a bad pixel memory 121, a line memory 122, the bad pixel detection unit 123, the pixel compensation unit 124, and the weight information generation unit 125. According to at least one example embodiment of the inventive concepts, the bad pixel memory 121 and line memory 122 may be, be included in, or be implemented as circuitry or by one or more circuits including, for example, registers or random access memory (RAM). According to at least one example embodiment of the inventive concepts, one or more of the bad pixel detection unit 123, the pixel compensation unit 124, and the weight information generation unit 125 may be, be included in, or be implemented as circuitry or by one or more circuits. Alternatively, according to at least one example embodiment of the inventive concepts, one or more of the bad pixel detection unit 123, the pixel compensation unit 124, and the weight information generation unit 125 may be implemented by a processor (e.g., the AP 200) executing code which includes instructions corresponding to the operations discussed herein as being performed by one or more of the bad pixel detection unit 123, the pixel compensation unit 124, and the weight information generation unit 125.

The bad pixel memory 121 stores bad pixel location information.

The bad pixel location information may be generated by detecting the locations of bad pixels and stored in the bad pixel memory 121 beforehand during a mass-production test of the image sensor 300. For example, the bad pixel location information may include the coordinates of each of the bad pixels.

The line memory 122 may temporarily store digital data IDATA having a predetermined, or, alternatively, reference size among the pixel data IDATA received from the image sensor 300, and output the stored pixel data IDATA to the bad pixel detection unit 123, the pixel compensation unit 124, and the weight information generation unit 125.

The size of the line memory 122 may be determined by the size of a kernel which will be described with reference to FIG. 4 below and the size of a column of the pixel data IDATA received from the image sensor 300.

For example, if the size of the kernel is M×N pixels and the size of a row and column of the pixel data IDATA received from the image sensor 300 is X×Y pixels, the size of the line memory 122 according to at least one example embodiment of the inventive concepts may be set to be (M−1)×Y pixels, i.e., the lengths of the row and column of the line memory 122 are (M−1) and Y pixels, respectively. Here, 'M', 'N', 'X', and 'Y' are integers each equal to or greater than '1'. However, one or more example embodiments of the inventive concepts are not limited thereto. In another embodiment, the size of the line memory 122 may be set such that the length of the row thereof is (M−1) pixels and the length, in pixels, of the column thereof is an integer that is greater than 'N' and less than 'Y'.

The bad pixel detection unit 123 may receive the bad pixel location information from the bad pixel memory 121, and detect a target pixel as a bad pixel when the coordinates of the target pixel are included in the bad pixel location information.

When the coordinates of the target pixel are not included in the bad pixel location information, the bad pixel detection unit 123 may receive the pixel data IDATA having the predetermined, or, alternatively, reference size among the pixel data IDATA of the image sensor 300 from the line memory 122, determine whether the target pixel is a bad pixel, and output the bad pixel detection signal BP_det.

Whether the target pixel is a bad pixel may be determined by applying the kernel to the pixel data IDATA that is temporarily stored in the line memory 122, setting a central pixel present in the kernel as the target pixel, and considering the central pixel together with neighboring pixels present within a predetermined, or, alternatively, reference distance from the vicinity of the central pixel.

Referring to FIG. 4, the bad pixel detection unit 123 according to at least one example embodiment of the inventive concepts uses a 5×5 kernel, based on the pixel data IDATA received from the line memory 122. The central pixel of the kernel means a pixel, the X and Y coordinates of which are (3,3), and the neighboring pixels of the kernel are pixels, the X and Y coordinates of which are (1,1) to (5,5), except for the central pixel located on the point (3, 3).

The bad pixel detection unit 123 may set the central pixel of the kernel as the target pixel, and generate histograms H1, H2, H3, and H4 each representing a distribution of pixel values in one of various directions, based on neighboring pixels present in a vertical direction $D_{00}$, a diagonal direction $D_{45}$, a horizontal direction $D_{90}$, and a diagonal direction $D_{135}$ with respect to the central pixel. The classes (horizontal axis) of each of the histograms H1, H2, H3, and H4 are determined according to the brightness L of pixel values, and the frequencies (vertical direction) of each of the histograms H1, H2, H3, and H4 are determined according to the number of pixel values corresponding to the brightness L of the pixel values.

As described above, a bad pixel means a pixel having a value less than or greater than a value of a normal pixel when the pixels are exposed to the same intensity of incident light.

Thus, the range of the classes of each of the histograms H1, H2, H3, and H4 generated in various directions may be increased, the classes are classified into several groups such that neighboring pixels except for the central pixel do not belong to a group to which the central pixel belongs. For example, the several groups may include a first group to which the central pixel belongs, and a second group to which the neighboring pixels except for the central pixel belong. For example, the several groups may include a first group to which the central pixel belongs, a second group to which the neighboring pixels in a direction $D_{00}$ belong, a third group to which the neighboring pixels in a direction $D_{45}$ belong, a fourth group to which the neighboring pixels in a direction $D_{90}$ belong, and a fifth group to which the neighboring pixels in a direction $D_{135}$ belong.

When the difference between the brightnesses L of pixel values between the group of the central pixel and groups of the neighboring pixelss is greater than a predetermined, or, alternatively, reference threshold value, the target pixel may be determined as a bad pixel. For example, the brightnesses L of a neighboring pixel group may be an average of the brightness values of all pixels of the neighboring pixel group or a median value of the brightness values of all pixels of the neighboring pixel group, but is not restricted thereto.

The pixel compensation unit 124 may receive the pixel data IDATA having the predetermined, or, alternatively, reference size among the pixel data IDATA of the image sensor 300 from the line memory 122, compensate for a pixel value of the target pixel, and output the compensated pixel value.

Referring to FIG. 4, the pixel compensation unit 124 according to at least one example embodiment of the inventive concepts may generate median values for the respective various directions $D_{00}$, $D_{45}$, $D_{90}$, and $D_{135}$ set by the bad pixel detection unit 123 to detect bad pixels, based on the central pixel and neighboring pixels present in the various directions $D_{00}$, $D_{45}$, $D_{90}$, and $D_{135}$. For example, the pixel compensation unit 124 may generate a first median value which is a median value of the brightness values of pixels in a direction $D_{00}$, a second median value which is a median value of the brightness values of pixels in a direction $D_{45}$, a third median value which is a median value of the brightness values of pixels in a direction $D_{90}$, and a fourth median value which is a median value of the brightness values of pixels in a direction $D_{135}$. The pixel compensation unit 124 may sequentially generate new median values that are not related to these directions from the above median values so as to generate a final median value, and output the final median value as the compensated pixel value PC_out. For example, the pixel compensation unit 124 may generate a new median value which is a median value of the first through fourth median values.

According to another embodiment of at least one example embodiment of the inventive concepts, the bad pixel detection unit 123 and the pixel compensation unit 124 may perform median filtering to determine whether the target pixel is a bad pixel and output the compensated pixel value PC_out of the target pixel.

The median filtering may be performed by arranging pixel values within the kernel according to size and extracting a median value of the pixel values, but one or more example embodiments of the inventive concepts are not limited thereto. According to another embodiment, the median filtering may be performed using a weighted median filter, a hybrid median filter, a selection median filter, a pseudo median filter, or a vector median filter.

The weight information generation unit 125 may generate a first noise level, a second noise level, and a third noise level, based on the pixel data IDATA received from the line memory 122 and an analog gain AG and exposure time information EXPT received from the image sensor setup unit 220.

Also, normalization may be performed such that a minimum value of each of the noise levels is greater than '0' and a maximum value of each of the noise levels is less than '1'.

The weight information generation unit 125 may selectively output the normalized first noise level, the normalized second noise level, or the normalized third noise level as weight information WI according to a selection signal SEL input from the ISP 240. As noise contained in the pixel value of the target pixel increases, a value of the weight information WI may increase.

The weight information generation unit 125 may include a local noise-level determination unit 125a and a global noise-level determination unit 125b. According to at least one example embodiment of the inventive concepts, one or more of the local noise-level determination unit 125a and global noise-level determination unit 125b may be, be included in, or be implemented as circuitry or by one or more circuits. Alternatively, according to at least one example embodiment of the inventive concepts, one or more of the local noise-level determination unit 125a and global noise-level determination unit 125b may be implemented by a processor (e.g., the AP 200) executing code which includes instructions corresponding to the operations discussed herein as being performed by one or more of the local noise-level determination unit 125a and global noise-level determination unit 125b.

Referring to FIG. 5, according to at least one example embodiment of the inventive concepts, the local noise-level determination unit 125a may receive the pixel data IDATA from the line memory 122, generate the first noise level for the target pixel, and perform the normalization on the first noise level to generate the weight information WI.

In detail, the first noise level may be determined by setting a central pixel within a 5×5 kernel as the target pixel and calculating a mean and a variation of neighboring pixels present within the kernel, except for the central pixel. For example, the first noise level may be determined based on a value $\mu_{sp}/\sigma_{sp}$ obtained by dividing a mean value $\mu_{sp}$ of the neighboring pixels by a variation value $\sigma_{sp}$ of the neighboring pixels. When the first noise level is low, the level of noise contained in the target pixel may be considered as being high.

According to another embodiment of at least one example embodiment of the inventive concepts, the global noise-level determination unit 125b may generate the second noise level for the pixel data IDATA of the image sensor 300 based on at least one among the analog gain AG and the exposure time information EXPT received from the image sensor setup unit 220, and generate the weight information WI by performing the normalization on the second noise level.

The analog gain AG is information regarding the slope of a ramp signal to be used to convert the difference between a reset signal sampled by correlated double sampling (CDS) and an image signal sampled by correlated double sampling into a digital signal in the image sensor 300 employing CDS. When the analog gain AG is high, noise contained in the pixel data IDATA may be considered as being high.

The exposure time information EXPT is related to exposure conditions of the image sensor 300 according to resultant control values such as exposure sensitivity, an aperture value, a shutter value, etc. When a value of the exposure time information EXPT is high, the noise contained in the pixel data IDATA may be considered as being high.

The normalized first noise level is the level of noise contained in each of pixel values of the pixel data IDATA and may thus have different values for the pixel values. The second noise level is the level of noise contained in the entire pixel data IDATA and may thus have the same value for the pixel values.

According to at least one other example embodiment of the inventive concepts, the local noise-level determination unit 125a and the global noise-level determination unit 125b may add the first noise level and the second noise level together, perform the normalization on a result of adding the first and second noise levels, and then output the normalized third noise level.

The weight information generation unit 125 may output the normalized first noise level, the normalized second noise level, or the normalized third noise level using the selection signal SEL generated by the control logic included in the ISP 240.

Figure 6:
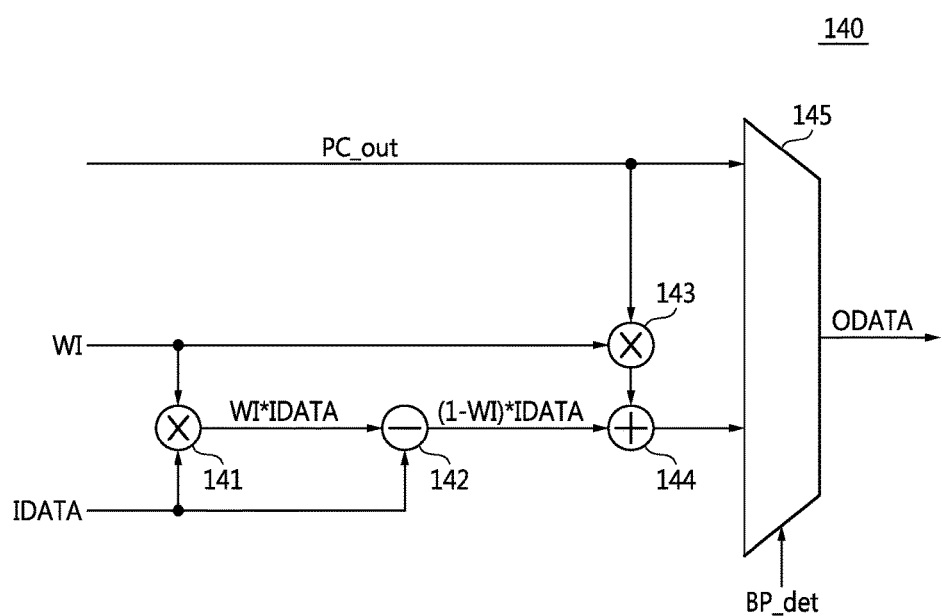
FIG. 6 is a detailed circuit diagram of a noise removal unit of FIG. 3.

FIG. 6 is a detailed circuit diagram of the noise removal unit 140 of FIG. 3.

Referring to FIGS. 1, 2, and 6, the image sensor 300 may output pixel data IDATA in the form of a stream to the noise removal unit 140.

The noise removal unit 140 may receive a pixel value of a target pixel included in the pixel data IDATA, and receive a bad pixel detection signal BP_det, a compensated pixel value PC_out, and weight information WI from the bad pixel processing unit 120.

The noise removal unit 140 may remove noise from the pixel value of the target pixel, based on the bad pixel detection signal BP_det, the pixel value, the compensated pixel value PC_out, and the weight information WI.

The noise removal unit 140 includes multipliers 141 and 143, a subtractor 142, an adder 144, and a multiplexer 145.

The multiplier 141 may multiply the pixel value of the target pixel included in the pixel data IDATA by the weight information WI and transmit a value WI×IDATA obtained by multiplying the pixel value by the weight information WI to the subtractor 142. The subtractor 142 may transmit to the adder 144 a value (1−WI)×IDATA obtained by subtracting the value WI×IDATA received from the multiplier 141 from the pixel value of the target pixel.

The multiplier 143 may multiply the weight information WI by the compensated pixel value PC_out and transmit to the adder 144 a value WI×PC_out obtained by multiplying the weight information WI by the compensated pixel value PC_out.

The adder 144 may add the value WI×PC_out received from the multiplier 143 and the value (1−WI)×IDATA received from the subtractor 142, and a result of adding these values to the multiplexer 145.

The multiplexer 145 may output the compensated pixel value PC_out when the target pixel is a bad pixel, i.e., when the bad pixel detection signal BP_det is '1', and output a pixel value (WI×PC_out)+((1−WI)×IDATA) obtained by removing noise from the pixel value of the target pixel when the target pixel is not a bad pixel, i.e., when the bad pixel detection signal BP_det is '0'. An output of the noise removal unit 140 may be determined by Equation 1 below.

$$ODATA = \begin{cases} PC\_out, & \text{if } BP\_det = 1 \\ WI \times PC\_out + (1-WI) \times IDATA, & \text{if } BP\_det = 0 \end{cases} \quad [\text{Equation 1}]$$

wherein 'IDATA' denotes the pixel value of the target pixel, 'PC_out' denotes the compensated pixel value obtained by compensating for the target pixel, 'WI' denotes the weight information, and 'BP_det' denotes the bad pixel detection signal.

According to at least one example embodiment of the inventive concepts, the noise removal unit 140 may remove noise from the pixel value of the target pixel, based on the pixel value of the target pixel, the compensated pixel value PC_out of the target pixel, the weight information WI, and the bad pixel detection signal BP_det.

As described above with reference to FIG. 4, the compensated pixel value PC_out obtained by compensating for the target pixel may be generated by setting a central pixel within the kernel as the target pixel and using neighboring pixels together with the central pixel. Thus, the compensated pixel value PC_out includes not only information regarding a pixel value of the central pixel but also information regarding pixel values of the neighboring pixels.

Thus, the noise removal unit 140 may efficiently remove noise from the target pixel in consideration of the information regarding the pixel values of the neighboring pixels of the target pixel without additionally including the line memory 122, unlike the bad pixel processing unit 120. Accordingly, the area of and power consumption in the pixel processing apparatus 100 according to at least one example embodiment of the inventive concepts may decrease.

Also, the pixel processing apparatus 100 according to at least one example embodiment of the inventive concepts is applicable to a low-price sensor that has a small area and consumes low power.

Figure 7:
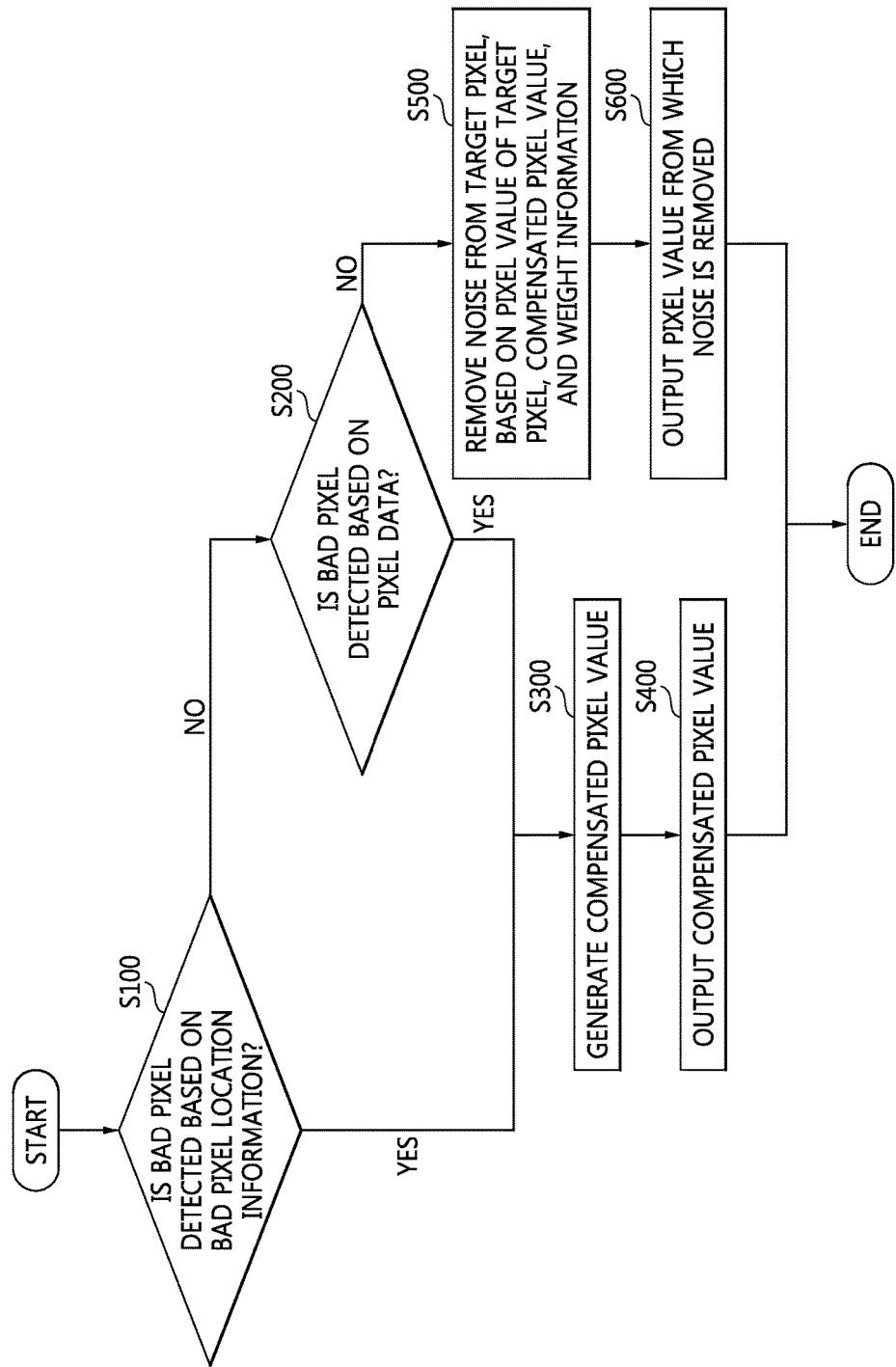
FIG. 7 is a flowchart of a method of operating a pixel processing apparatus according to at least one example embodiment of the inventive concepts.

FIG. 7 is a flowchart of a method of operating a pixel processing apparatus according to at least one example embodiment of the inventive concepts.

Referring to FIGS. 1 to 7, the bad pixel processing unit 120 according to at least one example embodiment of the inventive concepts may receive bad pixel location information from the bad pixel memory 121, and determine whether a target pixel is a bad pixel (operation S100).

The bad pixel location information may be generated by detecting the locations of bad pixels and stored in the bad pixel memory 121 beforehand during a mass-production test of the image sensor 300. The bad pixel location information may include the coordinates of each of the bad pixels.

When the coordinates of the target pixel are not included in the bad pixel location information, the bad pixel processing unit 120 may receive digital data having a predetermined, or, alternatively, reference size among pixel data IDATA of the image sensor 300 from the line memory 122, and determine whether the target pixel is a bad pixel (operation S200).

When it is determined that the target pixel is a bad pixel ('yes' in operation S100 or S200), the bad pixel processing unit 120 may generate a compensated pixel value PC_out by compensating for a pixel value of the target pixel, based on the bad pixel location information or the pixel data IDATA of the image sensor (operation S300), and output the compensated pixel value PC_out to the noise removal unit 140. The noise removal unit 140 may receive the compensated pixel value PC_out from the bad pixel processing unit 120 and output the compensated pixel value PC_out (operation S400).

When it is determined that the target pixel is not a bad pixel ('no' in operation S100 or S200), the bad pixel processing unit 120 may generate a compensated pixel value PC_out by compensating for the pixel value of the target pixel, generate weight information WI, and output the compensated pixel value PC_out and the weight information WI to the noise removal unit 140. The noise removal unit 140 may remove noise from the target pixel, based on the pixel value of the target pixel, the compensated pixel value PC_out, and the weight information WI (operation S500), and output the pixel value of the target pixel from which noise is removed (operation S600).

Figure 8:
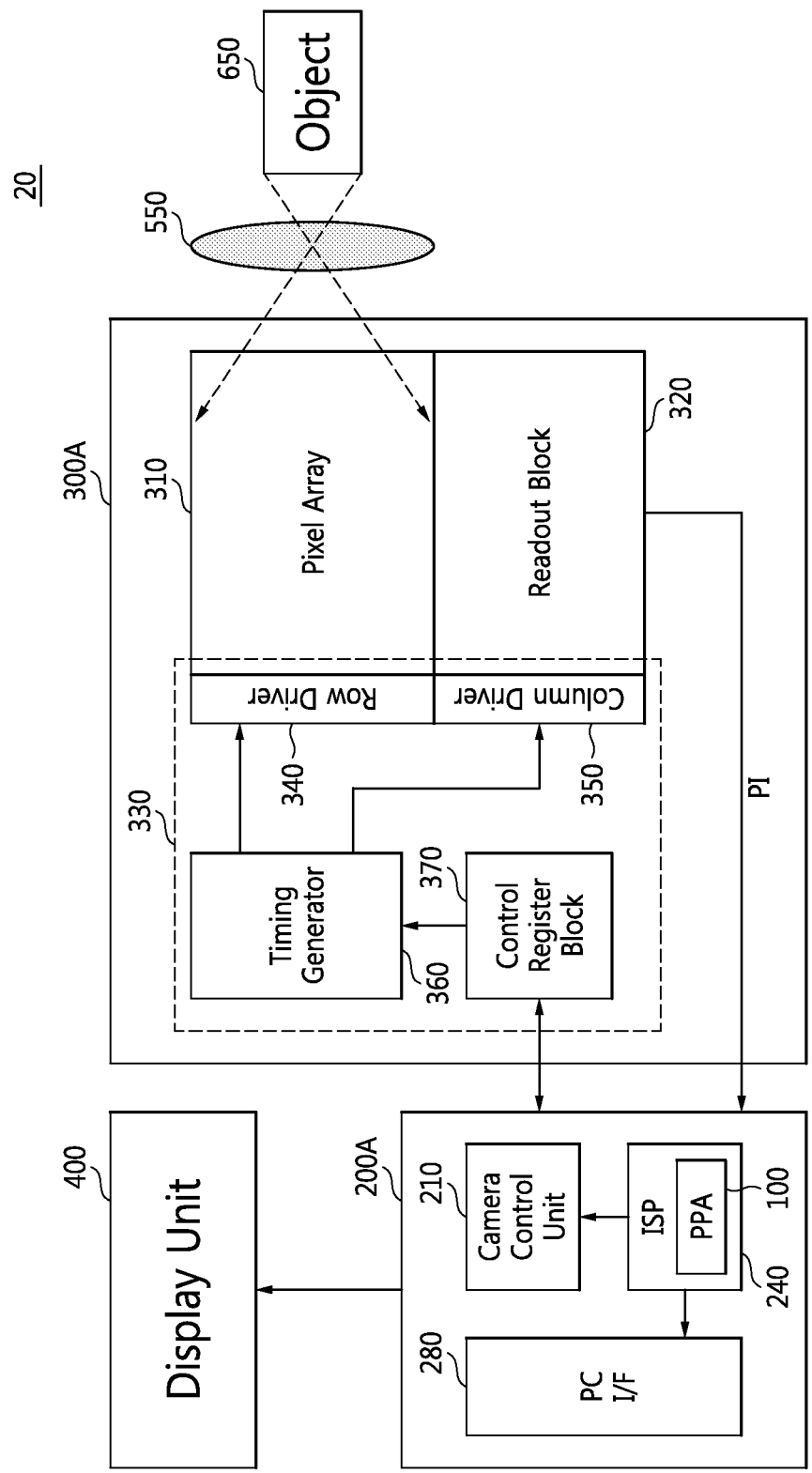
FIG. 8 is a block diagram of an image processing system with a pixel processing apparatus according to at least one example embodiment of the inventive concepts.

FIG. 8 is a block diagram of an image processing system 20 with a pixel processing apparatus (PPA) 100 according to at least one example embodiment of the inventive concepts.

Referring to FIG. 8, the image processing system 20 may include an image sensor 300A, a digital image processor (DSP) 200A, a display unit 400, and a lens 550.

The image sensor 300A may generate pixel data IDATA corresponding to the intensity of light incident via the lens 550, The image sensor 300A may include a pixel array 310, a readout block 320, and a control unit 330.

The pixel array 310 may include a plurality of pixels each accumulating photocharges generated from light of an object 650 incident via the lens 550 and generating an electric signal corresponding to the photocharges. The plurality of pixels may be arranged in a matrix including n rows and m columns. Here, 'n' and 'm' denote integers each equal to or greater than '1'.

Each of the plurality of pixels includes a plurality of transistors and a plurality of photoelectric transformation devices. For example, the plurality of photoelectric transformation devices may be photo diodes or pinned photo diodes. The pixel array 310 senses lights using the plurality of photoelectric transformation devices and converts the lights into electric signals. Each of the plurality of pixels may be referred to as an image pixel since a signal is generated by capturing an image.

The readout block 320 may remove noise, e.g., reset noise, from the electric signals generated by the plurality of pixels and perform analog-digital conversion (ADC) on the electric signals. The readout block 320 may temporarily store, amplify and output pixel data IDATA which is digital data obtained by performing ADC on the electric signals. Although not shown, the readout block 320 may include an analog-digital converter (ADC) that removes the noise and perform ADC; a memory that temporarily stores the pixel data IDATA, e.g., a static random access memory (SRAM); and a buffer that amplifies and outputs the temporarily stored pixel data IDATA.

The control unit 330 may generate a plurality of control signals for controlling operations of the pixel array 310 and the readout block 320, and supply the plurality of control signals.

The control unit 330 may include a row driver 340, a column driver 350, a timing generator 360, and a control register block 370.

The row driver 340 drives the pixel array 310 in units of rows. That is, the same control signal may be supplied to pixels belonging to the same row.

That is, the row driver 340 may decode the control signals output from the timing generator 360 and supply the decoded control signals to the pixel array 310.

The column driver 350 may generate a plurality of control signals to control an operation of the readout block 320, under control of the timing generator 360.

The timing generator 360 may control operations or timings of the row driver 340 and the column driver 350 by supplying a control signal to the row driver 340 and the column driver 350. The timing generator 360 may generate a control signal or a clock signal to be supplied to the row driver 340 and the column driver 350 by using a control signal or a clock signal received from the outside, e.g., a host.

In this case, the control register block 370 may operate under control of a camera control unit 210, and store or buffer a control signal or a clock signal. Also, the control register block 370 may control operations of the elements 310, 320, 330, 340, 350, 360, and 370 of the image sensor 300A.

The pixel data IDATA may be a signal in the form of a stream in which digital values corresponding to the respective pixels of the pixel array 310 are sequentially arranged. For example, when the pixel array 310 includes pixels arranged in a matrix including ten rows and ten columns, the pixel data IDATA may be a signal in the form of a stream in which a total of one hundred of digital values, including a digital value obtained by converting an electric signal output from a pixel belonging to a first row and a first column into a digital form to a digital value obtained by converting an electric signal output from a pixel belonging to a tenth row and a tenth column into a digital form, are sequentially arranged.

The DSP 200A may generate image data by processing pixels sensed by and output from the image sensor 300A, and output the image data to the display unit 400.

The DSP 200A may include the camera control unit 210, an ISP 240, and a PC I/F 280.

The camera control unit 210 controls the control register block 370. In this case, the camera control unit 210 may control the control register block 370 by using an inter-integrated circuit (I²C) but embodiments of the inventive concepts are not limited thereto.

The ISP 240 processes and handles the pixel data IDATA output from the image sensor 300A to obtain image data such that the pixel data IDATA is visible to human eyes, and output the image data to the display unit 400 via the PC I/F 280.

The ISP 240 may include the pixel processing apparatus 100 according to at least one example embodiment of the inventive concepts described above with reference to FIGS. 2 to 6.

The ISP 240 may be embodied as a separate chip from the image sensor 300A. According to another embodiment, the ISP 240 and the image sensor 300A may be embodied as one chip.

Examples of the display unit 400 include various devices capable of outputting an image from image data output from the DSP 200A. For example, the display unit 400 may be embodied as a computer, a mobile phone, a smart phone, or other image output terminals.

Figure 9:
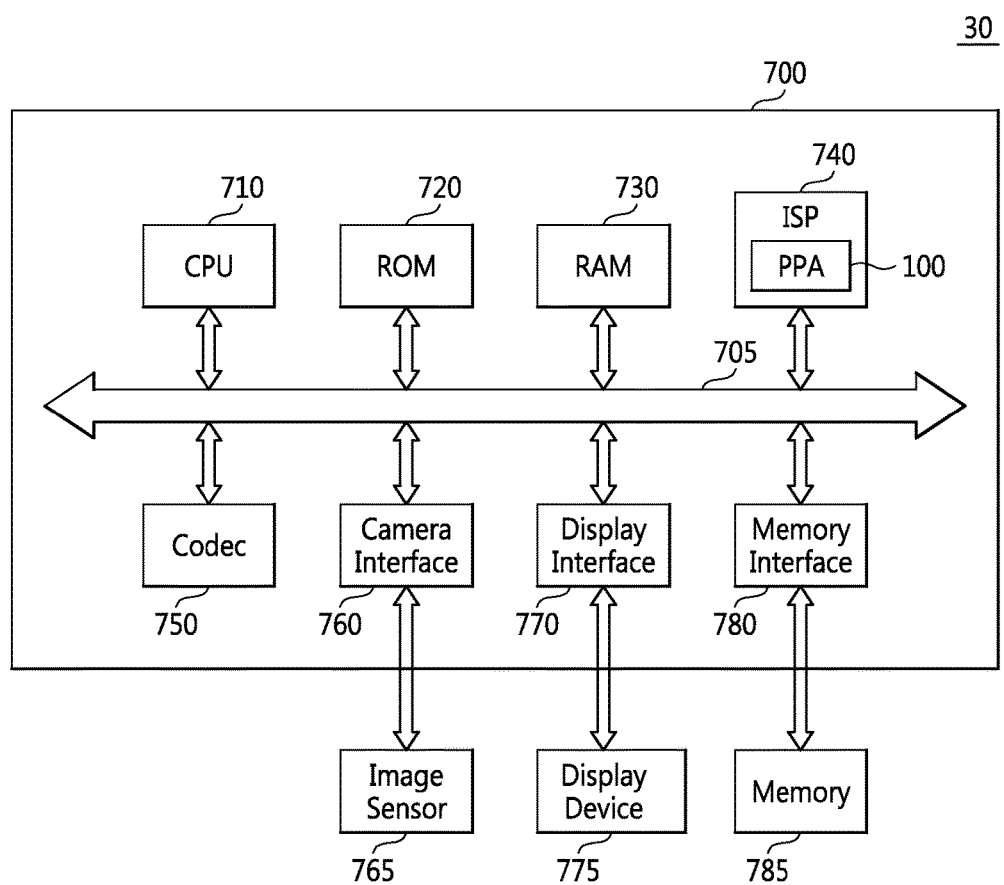
FIG. 9 is a block diagram of an image processing system according to at least one other example embodiment of the inventive concepts.

FIG. 9 is a block diagram of an image processing system 30 according to at least one other example embodiment of the inventive concepts.

Referring to FIG. 9, the image processing system 30 may be embodied as a mobile terminal, e.g., a smart phone, a tablet PC, a personal digital assistant (PDA), an enterprise digital assistant (EDA), a mobile internet device (MID), e-book, etc.

The image processing system 30 may include an application processor 700, an image sensor 765, a display device 775, and a memory 785.

The application processor 700 may include a central processing unit (CPU) 710, a read only memory (ROM) 720, a RAM 730, an ISP 740, a codec 750, a camera interface 760, a display interface 770, and a memory interface 780. The application processor 700 may be embodied as an SoC.

The elements 710, 720, 730, 740, 750, 760, 770, and 780 of the application processor 700 may exchange data with one another via a bus 705.

The CPU 710 may control overall operations of the application processor 700. For example, the CPU 710 may process or execute programs and/or data stored in the ROM 720 and/or the RAM 730.

In one embodiment, the CPU 710 may be embodied as one computing component with two or more independent processors (or cores), i.e., a multi-core processor.

The ROM 720 may store programs and/or data that is continuously used. In one embodiment, the ROM 720 may be an erasable programmable ROM (EPROM), an electrically erasable programmable ROM (EEPROM), etc.

The RAM 730 may temporarily store programs, data, and/or instructions. In one embodiment, the RAM 730 may be a dynamic RAM (DRAM) or an SRAM.

The RAM 730 may temporarily store data input or output via the interfaces 760, 770, and 780, or data generated by the codec 750 or the CPU 710.

The ISP 740 may image-process and handle data received from the RAM 730, the camera interface 750, or the memory interface 770 to obtain image data, and output the image data to the RAM 730, the display interface 760, or the memory interface 770. In one embodiment, the ISP 740 may be embodied as software, hardware, or a combination thereof.

Here, the ISP 740 may be substantially the same as the ISP 240 of FIG. 1, and may further include the pixel processing apparatus 100 described above with reference to FIGS. 2 to 6.

The codec 750 may encode or decode data input from the image sensor 765 or data to be output to the display device 775. Thus, the codec 550 may include an encoder (not shown) and a decoder (not shown).

The camera interface 760 may interface data received from the image sensor 765 installed outside the application processor 700, e.g., a pixel data IDATA.

The display interface 770 may interface data, e.g., image data, to be output to the display device 775 located outside the application processor 700.

The display device 775 may output an image or data regarding the image via a display such as an LCD, an AMOLED, etc.

The memory interface 780 may interface data input from or to be output to the memory 785 installed outside the application processor 700.

In one embodiment, the memory 785 may be a non-volatile memory, e.g., a flash memory, a resistive memory, etc.

In a pixel processing apparatus and an image signal processing apparatus and an image processing system each including the pixel processing apparatus according to at least one example embodiment of the inventive concepts, noise is removed from a target pixel by using information generated during detection of a bad pixel. Thus, the entire area of and power consumption in the pixel processing apparatus may decrease, and the pixel processing apparatus is applicable to a low-price sensor that has a small area and consumes low power.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A pixel processing apparatus comprising:
a bad pixel processing circuit configured to
receive pixel data of an image sensor,
store, in a line memory, reference pixel data having a reference size among the pixel data of the image sensor,
determine whether a target pixel is a bad pixel based on the stored reference pixel data,
generate a bad pixel detection signal according to a result of determining whether the target pixel is a bad pixel,
generate a compensated pixel value by compensating for a first pixel value of the target pixel based on the stored reference pixel data, wherein the compensated pixel value corresponds to an average or median pixel value for neighboring pixels present within a reference distance from the target pixel,
generate weight information based on the pixel data of the image sensor, by
generating a local noise level for the target pixel based on the stored reference pixel data by calculating a mean value and a variation value for the neighboring pixels and dividing the mean value by the variation value,
generating a global noise level for the pixel data of the image sensor based on at least one of an analog gain or exposure time information of the image sensor, and
generating the weight information based on the local noise level and the global noise level, and
output the bad pixel detection signal, the compensated pixel value, and the weight information; and
a noise removal circuit configured to
receive the pixel data of the image sensor,
receive the bad pixel detection signal, the compensated pixel value, and the weight information from the bad pixel processing circuit,
in response to the bad pixel detection signal indicating that the target pixel is a bad pixel, output the compensated pixel value for the target pixel, and
in response to the bad pixel detection signal indicating that the target pixel is not a bad pixel,
generate a second pixel value by removing noise from the first pixel value, based on the first pixel value, the compensated pixel value, and the weight information, such that the second pixel value is a weighted average between the first pixel value and the compensated pixel value, and
output the second pixel value for the target pixel, wherein the noise removal circuit does not use the reference pixel data stored in the line memory of the bad pixel processing circuit and does not include an additional memory for storing the reference pixel data.

2. The pixel processing apparatus of claim 1, wherein the bad pixel processing circuit comprises:
a bad pixel detection circuit configured to generate and output the bad pixel detection signal;
a pixel compensation circuit configured to generate and output the compensated pixel value; and
a weight information generation circuit configured to generate and output the weight information.

3. The pixel processing apparatus of claim 2, wherein the bad pixel detection circuit is configured to
apply an M×N kernel to the stored reference pixel data having the reference size, and
determine whether the target pixel is a bad pixel based on a central pixel and neighboring pixels that are present within the M×N kernel, wherein M an N are integers each equal to or greater than '1'.

4. The pixel processing apparatus of claim 2, wherein the weight information generation circuit is configured to
apply an M×N kernel to the stored reference pixel data having the reference size, and
generate the weight information based on a central pixel and neighboring pixels that are present within the M×N kernel, wherein M an N are integers each equal to or greater than '1'.

5. The pixel processing apparatus of claim 1, wherein the pixel data of the image sensor is image data in an RGB format.

6. An image signal processing system comprising:
an image sensor configured to generate pixel data in an RGB format; and
an application processor configured to process the pixel data,
wherein the application processor includes,
a bad pixel processing circuit configured to
receive the pixel data from the image sensor,
store, in a line memory, reference pixel data having a reference size among the pixel data of the image sensor,
determine whether a target pixel is a bad pixel based on the stored reference pixel data,
generate a bad pixel detection signal according to a result of determining whether the target pixel is a bad pixel,
generate a compensated pixel value by compensating for a first pixel value of the target pixel based on the stored reference pixel data, wherein the compensated pixel value corresponds to an average or median pixel value for neighboring pixels present within a reference distance from the target pixel,
generate weight information based on the pixel data of the image sensor, by
generating a local noise level for the target pixel based on the stored reference pixel data by calculating a mean value and a variation value for the neighboring pixels and dividing the mean value by the variation value,
generating a global noise level for the pixel data of the image sensor based on at least one of an analog gain or exposure time information of the image sensor, and
generating the weight information based on the local noise level and the global noise level, and output the bad pixel detection signal, the compensated pixel value, and the weight information; and
a noise removal circuit configured to
receive the pixel data of the image sensor,
receive the bad pixel detection signal, the compensated pixel value, and the weight information from the bad pixel processing circuit,
in response to the bad pixel detection signal indicating that the target pixel is a bad pixel, output the compensated pixel value for the target pixel, and
in response to the bad pixel detection signal indicating that the target pixel is not a bad pixel,
generate a second pixel value by removing noise from the first pixel value, based on the first pixel value, the compensated pixel value, and the weight information, such that the second pixel value is a weighted average between the first pixel value and the compensated pixel value, and
output the second pixel value for the target pixel.

7. The image signal processing system of claim 6, wherein the bad pixel processing circuit comprises:
a bad pixel detection circuit configured to generate and output the bad pixel detection signal;
a pixel compensation circuit configured to generate and output the compensated pixel value; and
a weight information generation circuit configured to generate and output the weight information.

8. An image signal processing system comprising:
an image sensor configured to generate pixel data;
a line memory configured to store reference pixel data having a reference size among the pixel data of the image sensor;
bad pixel processing circuitry configured to,
determine whether a target pixel is a bad pixel based on the stored reference pixel data,
generate a bad pixel detection signal according to a result of determining whether the target pixel is a bad pixel,
generate a compensated pixel value by compensating for a first pixel value, the first pixel value being a value from among values of the stored reference pixel data that corresponds to the target pixel, using the stored reference pixel data, wherein the compensated pixel value corresponds to an average or median pixel value for neighboring pixels present within a reference distance from the target pixel,
generate weight information based on the pixel data of the image sensor, by
generating a local noise level for the target pixel based on the stored reference pixel data by calculating a mean value and a variation value for the neighboring pixels and dividing the mean value by the variation value,
generating a global noise level for the pixel data of the image sensor based on at least one of an analog gain or exposure time information of the image sensor, and
generating the weight information based on the local noise level and the global noise level, and
output the bad pixel detection signal, the compensated pixel value, and the weight information; and
noise removal circuitry configured to,
receive the pixel data of the image sensor,
receive the bad pixel detection signal, the compensated pixel value, and the weight information from the bad pixel processing circuitry,
in response to the bad pixel detection signal indicating that the target pixel is a bad pixel, output the compensated pixel value for the target pixel, and
in response to the bad pixel detection signal indicating that the target pixel is not a bad pixel,
generate a second pixel value by removing noise from the first pixel value, based on the first pixel value, the compensated pixel value, and the weight information, such that the second pixel value is a weighted average between the first pixel value and the compensated pixel value, and
output the second pixel value for the target pixel.

9. The image signal processing system of claim 8, wherein the noise removal circuitry is configured to generate the second pixel value without using the reference pixel value data stored in the line memory.

10. The image signal processing system of claim 9, wherein the noise removal circuitry is configured to generate the second pixel value without storing the reference pixel data in a memory.

\* \* \* \* \*